United States Patent

[11] 3,631,487

| [72] | Inventors | Dean P. Huntsinger<br>Marion;<br>Floyd M. Totten, Cedar Rapids, both of Iowa |
| --- | --- | --- |
| [21] | Appl. No. | 17,674 |
| [22] | Filed | Mar. 9, 1970 |
| [45] | Patented | Dec. 28, 1971 |
| [73] | Assignee | Collins Radio Company<br>Cedar Rapids, Iowa |

[54] COMPLEMENTARY SEARCH SYSTEM FOR D.M.E.
6 Claims, 2 Drawing Figs.

[52] U.S. Cl.......................................................... 343/7.3,
343/5 DP
[51] Int. Cl......................................................... G01s 9/14,
G01s 9/16
[50] Field of Search........................................... 343/5 DP,
7.3

[56] References Cited
UNITED STATES PATENTS
3,321,757  5/1967  Crow et al. ................... 343/7.3
3,360,795  12/1967  Lundgreen et al............ 343/7.3
3,503,068  3/1970  Yamauchi..................... 343/7.3

*Primary Examiner*—Malcolm F. Hubler
*Attorneys*—Robert M. Sperry and Robert J. Crawford

ABSTRACT: An all-digital, distance measuring radio equipment is disclosed wherein the duration of each cycle of operation is determined by a train of clock pulses which is applied to a plurality of counters. Detection of a reply signal triggers a search counter which then counts until the end of the cycle. At the end of the cycle the count acquired by the search counter is transferred into a memory counter which starts the subsequent cycle at this value, establishes a range gate upon reaching a count corresponding to the maximum range, starts counting again from zero and ends the cycle at the same count that it held at the start of the cycle. A decode counter counts from the start of each cycle to the center of the range gate and, upon receipt of the range gate center signal, applies its acquired value to a readout means to indicate distance.

Patented Dec. 28, 1971

INVENTORS
DEAN P. HUNTSINGER
FLOYD M. TOTTEN
BY Robert M. Sperry
ATTORNEY

COMPLEMENTARY SEARCH SYSTEM FOR D.M.E.

This invention relates to distance measuring radio equipment and is particularly directed to an improved search technique for use with all-digital distance measuring equipments.

Devices for measuring distance by radio techniques, generally known as "DME systems," have gained wide acceptance in the aviation industry since they provide rapid and accurate determination of distance and, consequently, enhance navigation and air traffic control. Unfortunately, the prior art DME systems have been extremely complex and, hence, have been bulky, heavy, and expensive; whereas space and weight are always limited in aircraft, and expense is a matter of concern in any case. Furthermore, most of the prior art DME systems have been electromechanical or have been "quasi-digital"; that is, they have been partially digital, but also have employed monostable multivibrators which, when triggered by a short pulse, generate a longer pulse having a width and amplitude determined by the design of the multivibrator circuit. However, electromechanical components are relatively bulky, slower in operation and less accurate than electronic circuits, and generally do not provide digital outputs. Multivibrator circuits overcome many of the deficiencies of electromechanical systems. On the other hand, time measurements can be made by such circuits to an accuracy of only about one percent, at best. Although this accuracy is sufficient for some purposes, there is increasing demand for DME systems to supply information for fully automatic aircraft landing systems. This demand imposes extremely high accuracy requirements on the DME systems, which are far beyond the capabilities of multivibrator circuits. Furthermore, this demand couples the need for extreme accuracy with a requirement that the measurements be "up-dated" virtually instantaneously. Other DME systems have required the use of UP-DOWN counters which are relatively expensive and are difficult to obtain.

The disadvantages of the prior art are overcome with the present invention and an all-digital DME system is provided which is extremely rapid and highly accurate, yet is relatively simple and economical. Moreover, the DME system of the present invention leads itself to microminiaturized circuitry which provides reliability, compactness, lightness of weight, and reduction of cost.

The advantages of the present invention are preferably attained by providing an all-digital DME system employing four unidirectional counters in a unique manner to perform the search, track, and memory operations, and yields immediate readouts.

Accordingly, it is an object of the present invention to provide a DME system which is compact, lightweight, and inexpensive.

Another object of the present invention is to provide an improved search technique for DME systems.

A further object of the present invention is to provide an all-digital DME system.

A specific object of the present invention is to provide an all-digital DME system in which all time measurements are made by counting oscillator pulses and which employs only unidirectional counters.

These and other objects and features of the present invention will be apparent from the following detailed description taken with reference to the accompanying drawing.

Figure 1:
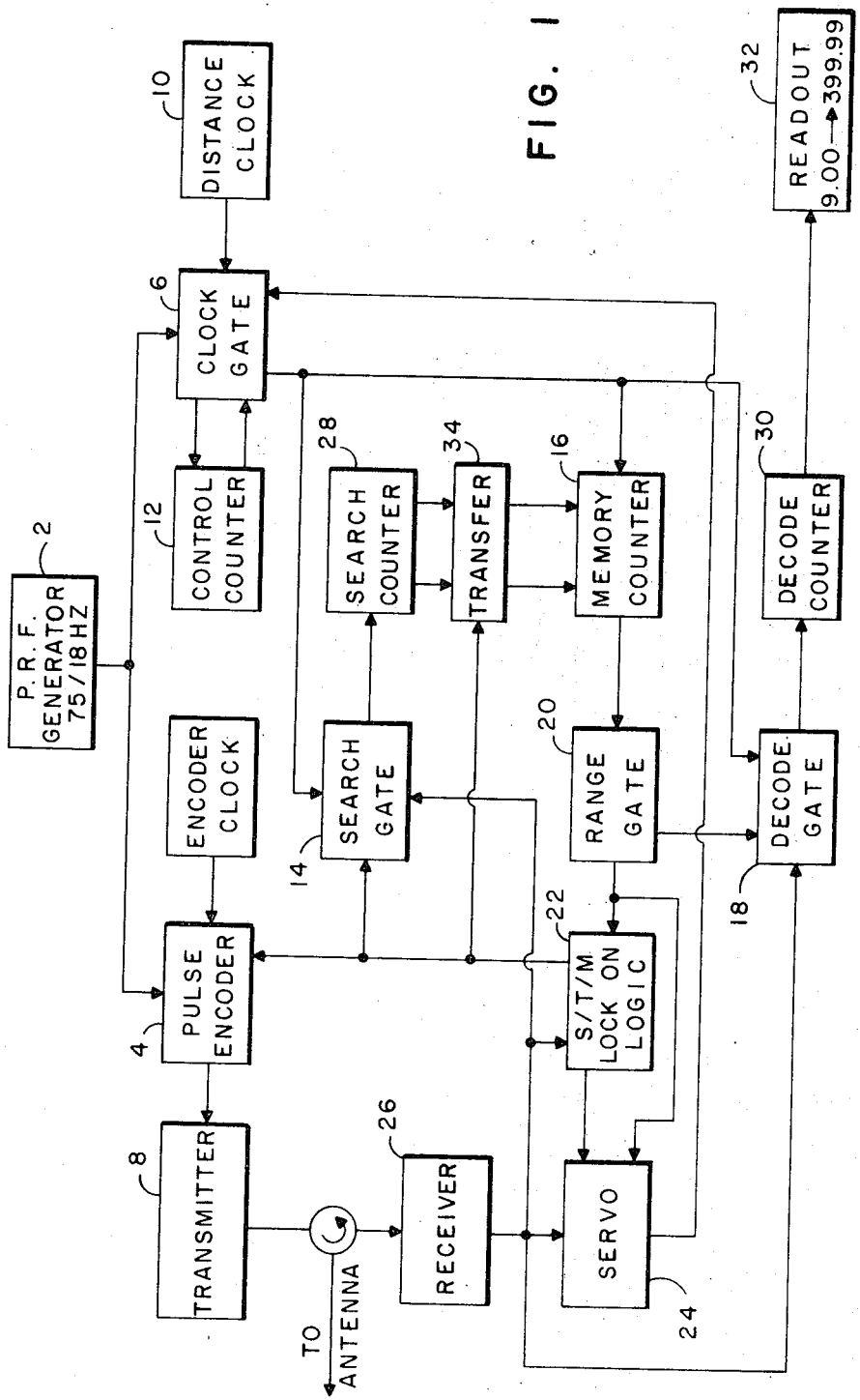
FIG. 1 is a block diagram of a DME system embodying the present invention.

In that form of the present invention chosen for purposes of illustration, FIG. 1 shows a DME system comprising a pulse repetition frequency generator 2 which supplies timing pulses to a pulse encoder 4 and clock gate 6. The pulse encoder 4 supplies a suitably coded signal to transmitter 8 which transmits the coded signal to interrogate a selected VOR/DME station. Simultaneously, encoder 4 applies a signal to clock gate 6, thereby allowing pulses from clock circuit 10 to pass to control counter 12. In a typical instance, clock circuit 10 is an oscillator which will provide pulses at a frequency of 809 kHz. so that the period between pulses will be equal to the round-trip propagation delay for 0.1 nautical miles. As is well known, DME systems determine distance by measuring the time between emission of an interrogation signal and receipt of a reply signal from the target station. However, the target stations require approximately 50 microseconds between receipt of the interrogation signal and transmission of the reply signal. To account for this, control counter 12 counts an appropriate number of the pulses from clock circuit 10 and, thereafter, applies a signal to clock gate 6 which causes clock gate 6 to pass a train of pulses from clock circuit 10 simultaneously to control counter 12, search gate 14, memory counter 16, and decode gate 18. Control counter 12 continues to count the pulses from clock circuit 10 and provides a signal to close lock gate 6 when clock circuit 10 has passed a train of pulses corresponding in number to the maximum range of the DME system. Thus, if the maximum range of the system is nominally 400 nautical miles, control number 12 will close clock gate 6 when the clock circuit 10 has passed train of 4,000 pulses. Memory counter 16 receives the pulses from lock gate 6 and passes signals through range gate circuit 20 to "lock-on" logic circuit 22 and servo 24. Receiver 26 detects signals transmitted by the target station and applies these signal to servo 24, logic circuit 22, and search gate 14. Search gate 14 responds to the signals from receiver 26 by passing the pulses from clock gate 6 to the search counter 28. Logic circuit 22 applies signals to pulse encoder 4 and search gate 14 to control whether the system is operating in the "search" mode or "track" mode and, also, applies a "transfer" signal to memory counter 16 for purposes which will be more fully described subsequently. Finally, range gate circuit 20 is responsive to receipt of a predetermined signal from memory counter 16 to apply a signal to decode gate 18 which causes decode gate 18 to pass pulses from clock gate 6 to decode counter 30 which, in turn, applies a signal indicative of distance to readout means 32.

In operation, pulse generator 2 emits a pulse signal which arms clock gate 6 and which is encoded by pulse encoder 4 and transmitted by transmitter 8. Simultaneously, the signal from pulse generator 2 serves to open clock gate 6 to pass clock pulses from clock circuit 10 to control counter 12. Control counter 12 counts the number of pulses needed to provide the desired time delay and, then, applies a signal to cause clock gate 6 to pass a train of clock pulses simultaneously to control counter 12, search gate 14, memory counter 16, and decode gate 18.

Thereafter, control counter 12 continues to count the pulses emitted by clock circuit 10 and, when the number of pulses in the train corresponds to the maximum range of the system, control counter 12 emits a signal which closes clock gate 6 and, hence, halts the flow of pulses to search gate 14, memory counter 16, and decode gate 18. As an example, in a DME system designed to provide 0.1 nautical mile accuracy over ranges up to a maximum of 400 miles, the clock circuit 10 wound emit pulses at a frequency of 809 kHz. and control counter 12 would allow a train of 4,000 pulses to pass after the initial time delay, before closing clock gate 6.

In the "search" mode, search gate 14 is initially closed, while decode gate 18 is initially open. Thus, when control counter 12 opens lock gate 6 to pass the train of 4,000 clock pulses, memory counter 16 and decode counter 30 begin counting these pulses. However, since search gate 14 is closed, no pulses are passed to search counter 18. When a reply signal from a target station is detected by receiver 26, this signal is applied to open search gate 14. Thereafter, the pulses passed by clock gate 6 will be passed by search gate 14 to be counted by search counter 28. When control counter 12 has counted 4,000 pulses, it applies a signal to close clock gate 6. This terminates the cycle of operation by halting the flow of clock pulses to memory counter 16, search counter 28, and decode counter 30. Upon cessation of the flow of clock pulses, memory counter 16 applies a signal through range gate circuit 20 to logic circuit 22. In response to this, logic circuit 22 applies a signal to transfer unit 34 to cause the count held by search counter 28 to be transferred into memory counter 16. It will be seen that, during this cycle of operation, memory counter 16 counted the full train of 4,000 pulses; while search counter 28 acquired a count equal to 4,000 minus the number of pulses occurring between the start of the cycle and detection of the reply signal by receiver 26. Thus, for example, if the reply signal was detected at a point in time corresponding to 50 miles (500 counts), search counter 28 would start at this point and would have acquired a count of 3,500 at the end of the cycle. This value would then be transferred into the memory counter 16. In the second cycle of operation, memory counter 16 will again receive a train of 4,000 pulses from clock gate 6. However, since it has been preset to 3,500, the memory counter 16 will count from 3,500 to 4,000 and then start over from zero and, at the end of this second cycle, the memory cycle will again hold a count of 3,500. Moreover, since memory counter 16 held a count of 3,500 at the start of the second cycle, it will be seen that the memory counter 16 will reach the count of 4,000 at a point in time occurring 500 counts after the start of the second cycle. This corresponds to the point in the first cycle at which the reply signal was detected by receiver 26 and is the point in the second cycle at which, if the reply was valid, reception of a second reply signal is expected. However, for various reasons, the precise arrival time of the reply signal may vary somewhat. To accommodate for this, when memory counter 16 acquires a count of 3,996 pulses, memory counter 16 sends a signal to open range gate circuit 20 which, in turn, applies signals to logic circuit 22 and servo 24 to "arm" the system for the expected arrival of a reply signal. Thereafter, memory counter 16 continues counting to 4,000 pulses and then starts again from zero. Upon reaching a count of 0,004, memory counter 16 sends a signal to close range gate 20. In response to this signal, range gate circuit 20 applies a signal to logic circuit 22 and servo 24 to "disarm" the system. It will be seen from this that the range gate circuit 20 is "open" for eight pulses. However, after four of these, range gate circuit 20 applies a signal to close decode gate 18. This halts the flow of pulses from clock gate 6 to decode gate 18 and causes decode counter 30 to apply a signal indicative of distance to readout means 32.

Figure 2:
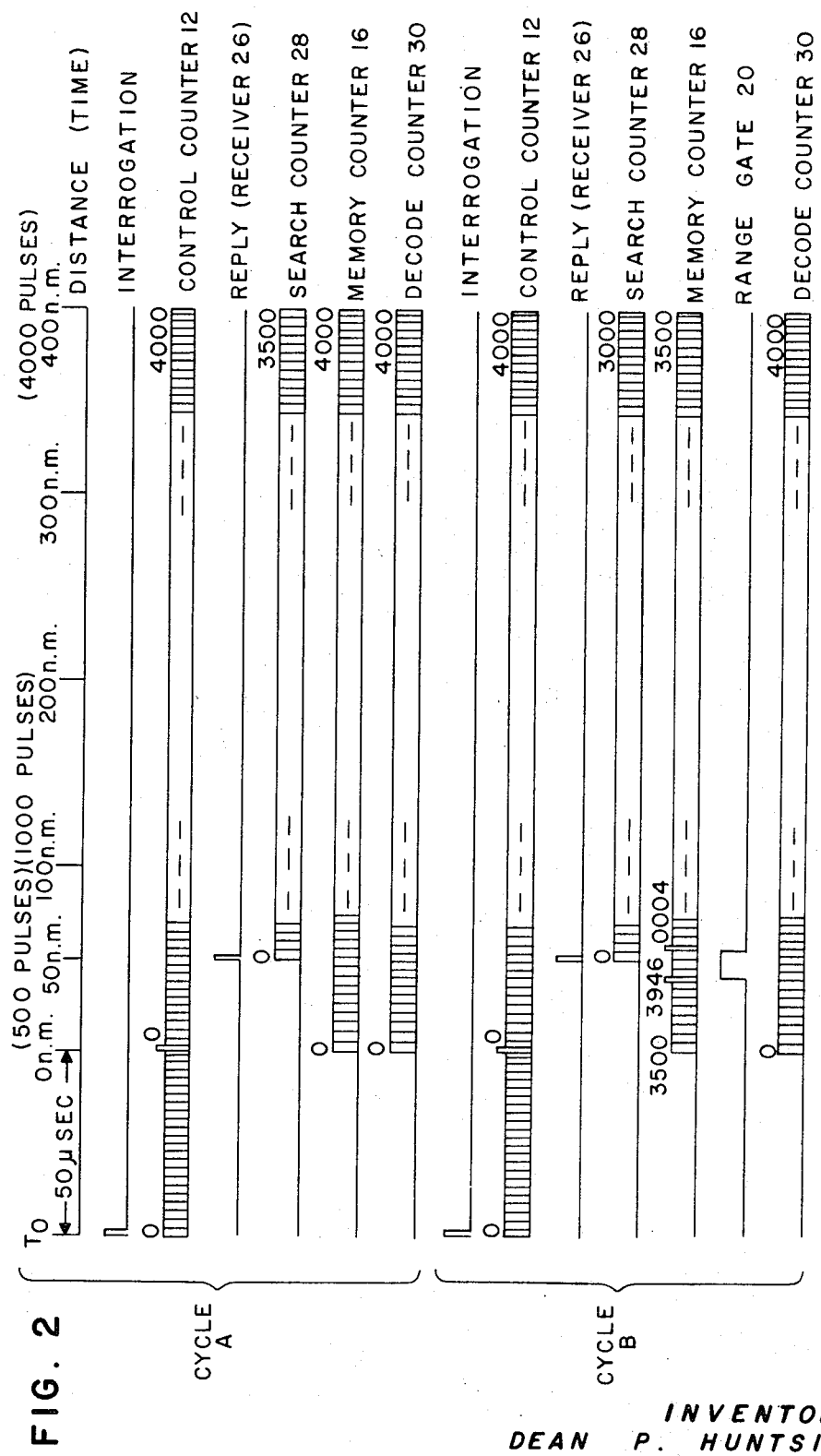
FIG. 2 is a timing chart representing the sequence of operation of the elements of the DME system of FIG. 1 during several cycles of operation.
Figure 2:
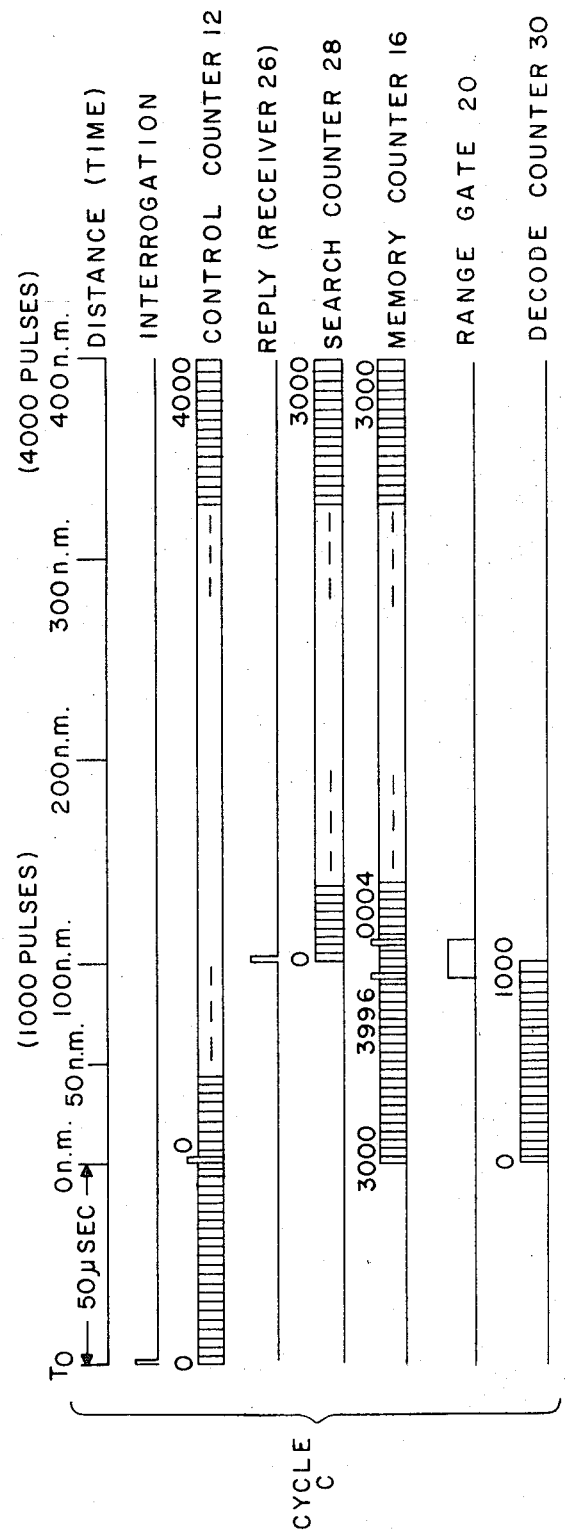

The operation of the DME system of the present invention can best be understood by describing, in detail, several successive cycles of operation of the system. Accordingly, FIG. 2 shows timing sequences for three successive cycles of operation, indicated respectively in FIG. 2 as Cycles A, B, and C. Cycle A occurs when the DME system of FIG. 1 is initially turned "on." For convenience, it will be assumed that each cycle starts with the emission at time $T_o$ of the interrogation pulse by pulse encoder 4 and simultaneous application of a signal by pulse generator 2 to open clock gate 6 to pass pulses from clock circuit 10 to control counter 12. As is well known, VOR/DME stations require approximately 50 microseconds between receipt of an interrogation signal and emission of a reply signal. Hence, if the aircraft is directly over the target station, reception of a reply signal could be expected approximately 50 microseconds after transmission of the interrogation signal. To avoid detection of replies intended for other aircraft and spacious signals of various types, control counter 12 counts sufficient pulses from clock circuit 10 to provide a time delay of approximately 50 microseconds. At the end of this time delay, control counter 12 starts counting a train of 4,000 pulses, corresponding to the maximum range of the system, and triggers clock gate 6 to pass this train of pulses simultaneously to search gate 14, memory counter 16, and decode gate 18. In Cycle A, all of the clock pulses of the pulse train are counted by memory counter 16 and, since decode gate 18 is "open" at the start of the cycle, by decode counter 30.

However, search gate 14 is "closed" at the start of the cycle and blocks the train of pulses from search counter 28. When a reply signal is detected by receiver 26, this signal is applied to "open" search gate 14 and, hence, to allow the remainder of the pulse train to be passed to search counter 28. For example, if a reply signal is detected by receiver 26 at a point in time corresponding to a distance of 50 miles, search ate 14 will remain "closed" during the first 500 pulses of the pulse train. Upon detection of the reply signal, receiver 26 will apply the signal to "open" search gate 14 and to pass the remaining 3500 clock pulses of the pulse train to search counter 28. When control counter 12 has acquired a count of 4,000, it applies a signal to "close" clock gate 6 and, thereby, halts the flow of clock pulses from clock circuit 10 to control counter 12, search counter 28, memory counter 16, and decode counter 30. Thus at the end of Cycle A memory counter 16 and decode counter 30 have each counted the full 4,000 pulses, while search counter 28 has counted only 3500 pulses. When the flow of clock pulses is terminated, memory counter 16 passes a signal through range gate circuit 20 to logic circuit 22, causing the logic circuit 22 to apply a signal which triggers transfer circuit 34 to transfer the count held by search counter 28 into memory counter 16. At this point, search counter 28 holds a count of zero, memory counter 16 holds a count of 3,500, and decode counter 30 holds a count of 4,000 which is equivalent to zero since it is the maximum range of the system.

In Cycle B the cycle begins when pulse generator 2 passes simultaneous pulses to pulse encoder 4 and clock gate 6, causing pulse encoder 4 to transmit an interrogation signal and causing clock gate 6 to start passing clock pulses from oscillator 10 to control counter 12. Control counter 12 counts the number of clock pulses required to provide the 50 microsecond time delay and then applies a signal to cause clock gate 6 to start passing a train of 4,000 clock pulses simultaneously to control counter 12, search gate 14, memory counter 16, and decode gate 18. As in Cycle A search gate 14 is initially closed while decode gate 18 is initially open. Hence, the train of pulses from clock gate 6 are blocked from search counter 28 but are counted by memory counter 16 and decode counter 30. Meanwhile control counter proceeds to count the 4,000 pulses of the pulse train. Decode counter 30 starts each cycle counting from zero. However, it will be recalled that the search counter 28 acquired a count of 3,500 during Cycle A which was transferred into memory counter 16 after the end of Cycle A. Accordingly, memory counter 16 stores this value at the start of Cycle B and when clock gate 6 opens to pass, the train of pulses for Cycle B, memory counter 16 proceeds to count from the stored value. When 496 clock pulses of Cycle B have been passed, memory counter 16 will hold a count of 3,996 and will pass a signal to open range gate circuit 20 causing the range gate circuit 20 to apply signals to logic circuit 22, servo 24, and decode gate 18 to arm the system for the expected arrival of a reply signal. Let us assume that the reply signal detected in Cycle A was a "squitler" and hence will not be repeated in Cycle B. Memory counter 16 will continue counting, and upon reaching 4,000 will proceed counting from zero. Also, at this point, range gate circuit 20 applies a signal to close decode gate 18. Upon reaching a count of 0,004, memory counter 16 sends a signal to close range gate circuit 20 causing range gate circuit 20 apply signals to disarm logic circuit 22 and servo 24. Let us further assume that a valid reply signal is detected by receiver 26 at 100 miles. Receiver 26 applies this signal to open search gate 28 to permit passage of subsequent pulses from clock gate 6 to search counter 28. Thereafter when control counter 12 acquires a count of 4,000, it applies a signal to close clock gate 6. This halts passage of the train of clock pulses to search counter 28, memory counter 16, and decode gate 18, and terminates Cycle B. At this point, search counter 28 holds a count of 3,000; while memory counter 16 has returned to the count of 3,500 which it held at the start of cycle B. When the flow of clock pulses is halted, memory counter 16 sends a signal through range gate circuit 20 to logic circuit 22 indicating the end of the cycle. In response to this signal logic circuit 22 again triggers transfer circuit 34 which applies signals to clear memory counter 16 and to transfer the count held by search counter 28 (3,000 counts) into memory counter 16.

Cycle C begins, like the preceding cycles, when pulse generator 2 passes a pulse simultaneously to pulse encoder 4 and clock gate 6. Thereupon pulse encoder 4 causes transmitter 8 to transmit the interrogation signal, while clock gate 6 opens to pass clock pulses from oscillator 10 to control counter 12 which counts the number of pulses required to provide the 50 microseconds time delay and then passes a signal to open clock gate 6 to pass a train of 4,000 pulses to search gate 14, memory counter 16, and through decode gate 18 to decode counter 30. As in the previous cycles, search gate 14 is initially closed and blocks passage of clock pulses from reaching search counter 28, while decode gate 18 is initially open and passes the train of clock pulses to decode counter 30 which starts counting from zero. Since memory counter 16 was set to a count of 3,000 following the end of Cycle B, it starts counting from that value and after 996 clock pulses of Cycle C will have acquired a count of 3,996. At this point memory counter 16 applies a signal to range gate circuit 20 which in turn applies signals to arm decode gate 18, logic circuit 22, and servo 24 for the expected arrival of a reply signal.

We have assumed that the signal detected at 100 miles in Cycle B was a valid reply, therefore, receiver 26 will again detect a reply signal at 100 miles (1,000 pulses) and will apply this signal to decode gate 18, logic circuit 22, servo 24, and search gate 14. Since this reply signal has been detected during the interval in which the system was armed to expect a reply, decode gate 18 closes and applies a signal to cause decode counter 30 to pass its acquired value (1,000 pulses) to readout means 32. At the same time, logic circuit 22 and servo 24 switch the system to operate in the "TRACK" mode.

If desired, the system of the resent invention may be made to provide initial time delay of less than 50 microseconds to permit detection of signals occurring at "negative" distances, as described in my copending U.S. Pat. application, Ser. No. 870,026, filed Oct. 28, 1969. In addition, numerous other variations and modifications may be made without departing from the present invention. Accordingly, it should be clearly understand that the form of the present invention described above and shown in the accompanying drawing is illustrative only and is not intended to limit the scope of the invention.

What is claimed is:

1. A digital DME system comprising:
   a pulse generator,
   transmitter means connected to receive pulses from said pulse generator and responsive thereto to transmit an interrogation signal;
   a clock oscillator;
   a control counter operative to generate a first signal upon completion of a first train of clock pulses defining a predetermined time interval and to generate a second signal upon completion of a second train of clock pulses corresponding to the maximum range of said system;
   a normally closed search gate;
   a search counter connected to receive and count clock pulses passed by said search gate;
   a memory counter connected to receive said clock pulses and operative upon reaching a first predetermined count to pass a first signal and operative upon reaching a second predetermined count to pass second signal and operative upon completion of said second train of clock pulses to pass a third signal;
   a normally open decode gate;
   a decode counter connected to receive and count clock pulses passed by said decode gate;
   clock gate means connected to receive pulses from said pulse generator and said first and second signals from said control counter and responsive to pulses from said pulse generator to pass clock pulses from said clock oscillator to said control counter and responsive to said first signal from said control counter to pass said clock pulses simultaneously to said search gate, said memory counter, and said decode gate and upon receipt of said second signal to discontinue passage of aid clock pulses;
   receiver means for receiving reply signals and responsive thereto to apply a signal to said search gate to cause said search gate to pass said clock pulses to said search counter;
   range gate circuit means connected to receive said signals from said memory counter and responsive to said first signal from said memory counter to arm said system for the expected arrival of a reply signal, and after a predetermined time delay, to generate and apply a signal to close said decode gate and responsive to said second signal from said memory counter to disarm said system;
   transfer means actuable to transfer counts from said search counter to said memory counter; and
   logic circuit means connected to receive said third signal from said memory counter and responsive thereto to actuate said transfer means.

2. The apparatus of claim 1 wherein:
   said clock oscillator emits clock pulses spaced in time intervals corresponding to the travel time of radio signals over a predetermined distance.

3. The apparatus of claim 1 wherein:
   said clock oscillator emits clock pulses at a frequency of 809 kHz.

4. The apparatus of claim 1 wherein:
   said predetermined time interval defined by said first series of clock pulses counted by said control counter is slightly less than 50 microseconds.

5. The apparatus of claim 1 further comprising:
   readout means; and
   means included in said decode gate and responsive to receipt of a reply signal by said receiver means during the interval when said system has been armed by said range gate circuit to cause said decode counter to pass a signal to said readout means indicative of the count held by said decode counter.

6. The apparatus of claim 1 wherein:
   said predetermined time delay employed by said range gate circuit means is equal to half of the time interval between said first and second signals from said memory counter.

* * * * *